United States Patent [19]

Fukui

[11] Patent Number: 5,414,721
[45] Date of Patent: May 9, 1995

[54] SERIAL DATA RECEIVING DEVICE

[75] Inventor: Yoshimitsu Fukui, Nara, Japan

[73] Assignee: Sharp Kabushiki Kaisha, Osaka, Japan

[21] Appl. No.: 872,001

[22] Filed: Apr. 22, 1992

[30] Foreign Application Priority Data

May 29, 1991 [JP] Japan .................. 3-126046
May 29, 1991 [JP] Japan .................. 3-126047

[51] Int. Cl.6 .............................................. G06F 7/02
[52] U.S. Cl. ...................................... 371/67.1; 371/48
[58] Field of Search ............... 371/67.1, 68.1, 68.2, 371/57.1, 55, 48; 340/146.2

[56] References Cited

U.S. PATENT DOCUMENTS 3,824,547  7/1974  Green et al. .
5,003,308  3/1991  Furniss et al. .
5,155,486 10/1992  Murfet et al. .................. 375/106
5,199,107  3/1993  Ozawa ........................... 395/325
5,252,902 10/1993  Uehara et al. .
5,319,598  6/1994  Aralis et al. .

FOREIGN PATENT DOCUMENTS 1288043 11/1989 Japan ..................... G06F 13/00
0497639  3/1992 Japan ..................... H04L 25/03

Primary Examiner—Robert W. Beausoliel, Jr.
Assistant Examiner—Albert Decady

[57] ABSTRACT

A serial data receiving device which capable of identifying serial data received even though the received data contains some degrees of error and/or different numbers of bits includes a data receiving shift register for receiving serial data and for storing the received serial data, a data register for storing ID codes, and a data comparator for comparing the serial data stored in the data receiving shift register with the ID codes stored in the data register and for outputting a data coincidence signal at a time when predetermined numbers of bits are matched.

17 Claims, 8 Drawing Sheets

Fig.5

```
              Y         X
←0 1 0 1 0 0 0 1 0 0 0 0 1 0 1 1 0 1 0 1 0 1 0 1 1 0 1
DATA START                         ↓
                           DATA COINCIDENCE SIGNAL
```

Fig.7

```
             A    5   X
←0 1 0 0 1 0 0 1 0 0|1 0 1 0|0 1 0 1 0 1 0 1 1 0 1
DATA START                    ↓
                      DATA COINCIDENCE SIGNAL
```

Fig.10

```
        1 (16)|   0   |  A  |  5  X
←0 1 0 1|0 0 0 1|0 0 0 0|1 0 1 0|0 1 0 1|0 1 0 1 1 0 1
          (2)
DATA START                      ↓
                        DATA COINCIDENCE SIGNAL
```

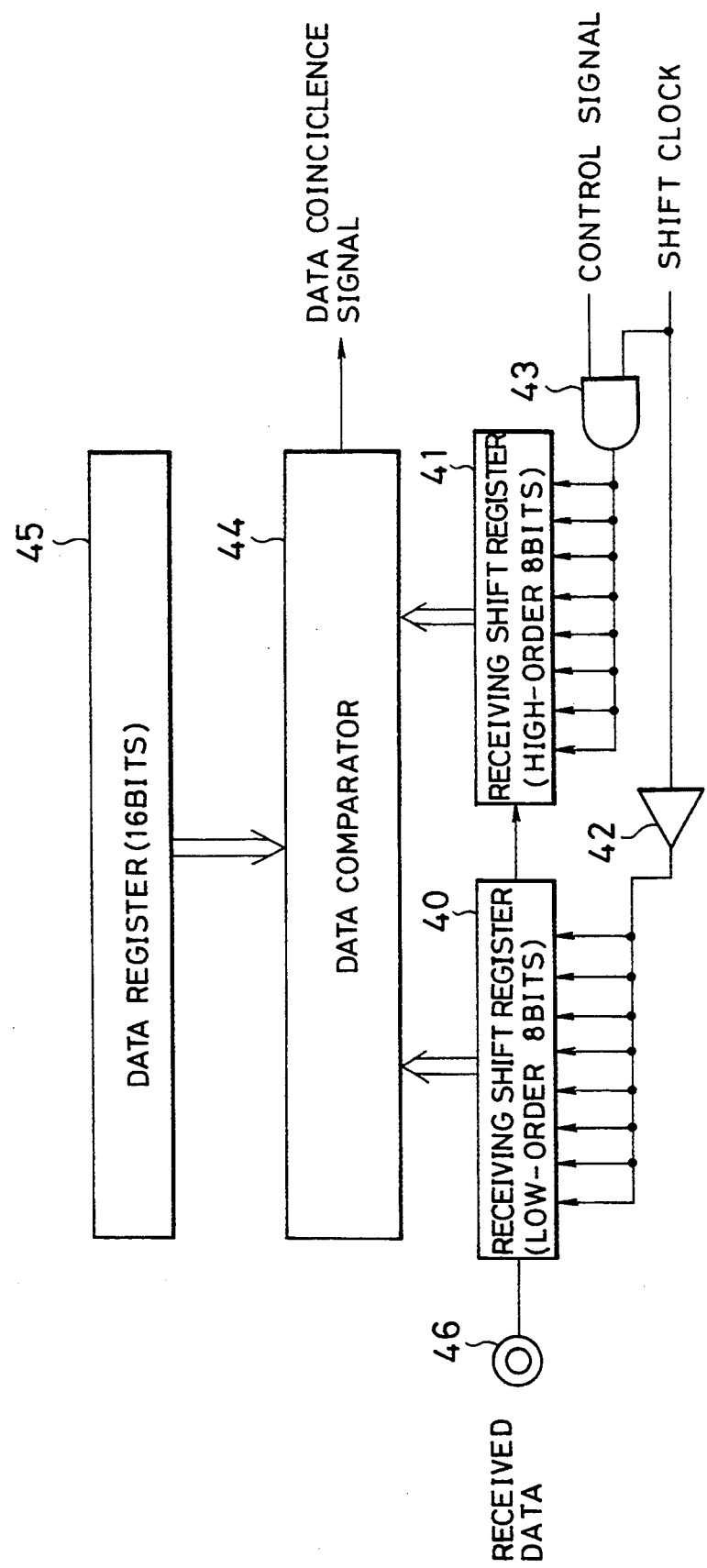

SERIAL DATA RECEIVING DEVICE

BACKGROUND OF THE INVENTION

1. Field of The Invention

This invention relates to a serial data receiving device for receiving serial data.

2. Description of the Related Art

A serial data receiving device which has a structure as shown in FIG. 1 is known to the present Applicants.

As shown in FIG. 1, the above-mentioned serial data receiving device includes a receiving shift register 10, a shift clock 11, an input terminal 12 for receiving data, a counter 13, a data processing circuit 14, and a data bus 15.

The receiving shift register 10 reads in serial data input from the input terminal 12 in synchronization with signals output from the shift clock 11. The signal output from the shift clock 11 is also input into the counter 13. When a specified number of bits are read in the shift register 10, a data reception end signal is output.

The data processing circuit (CPU) 14 detects an end of data reception by monitoring a data reception end signal, or detects an end of data reception by receiving a data reception end signal as an interrupt signal, and the data processing circuit 14 processes the received data from the receiving shift register 10 through the data bus 15.

FIG. 2 shows an example of a system composed of a plurality of serial data receiving devices which is known by the the present applicants.

The system shown in FIG. 2 is so arranged that the system receives serial data from a transmitter 20 by n units (here n being a positive integer number) of the serial data receiving devices 21 through 2n.

The data transmitted from the transmitter 20 is composed of "data bit", "ID code", and "data" so as to identify the receiving device to which the data is directed.

The receiving devices 21 to 2n are so arranged that each of the receiving devices 21 to 2n determines whether or not the ID code agrees with their own codes whenever data is sent, and processes the data only in case a that the ID code agrees with their own codes.

However, in the above-mentioned system shown, each of the data processing circuits of the receiving devices must have a function of identifying the II) code, thereby a load of a software installed in the data processing circuit becomes very large.

In addition, the above-mentioned serial data receiving devices are so arranged that they read in the data only in a case that the received ID code perfectly agrees with the ID code assigned to their specific codes.

Consequently, there is a high possibility that the data cannot be read in a case that a transmission error has occurred, resulting in a partial change of the bits of the ID code.

In case that the data processing circuit 14 performs a processing which tolerates an error of one bit or so, the data processing circuit 14 must read the data in bit units, thereby a load of the software becomes more heavy.

SUMMARY OF THE INVENTION

It is therefore an object of the present invention to provide a serial data receiving device which is capable of identifying the data correctly even though the received data contains some degrees of error and/or different numbers of bits.

The object of the present invention can be achieved by a serial data receiving device which is capable of identifying serial data received even though the received data contains some degrees of error and/or different numbers of bits, the serial data receiving device includes a first storage unit for receiving serial data and for storing the received serial data, a second storage unit for storing identification data, and a unit for comparing the serial data stored in the first storage unit with the identification data stored in the second storage unit and for outputting a detection signal in accordance with a result of the comparison.

In operation, the first storage unit receives and holds serial data, the second storage unit holds identification data, and the comparing unit outputs a detection signal when the serial data received by the first storage unit and the identification data match by predetermined numbers of bits.

Therefore, even though the input serial data does not match the identification data completely, a detection signal is output. In this way, data can be identified even if an error is contained in the identification data, so that the load of the software can be reduced.

Preferably, the serial data receiving unit further includes a unit connected to the comparing unit for determining the serial data stored in the first storage unit to be matched with the identification data stored in the second storage unit.

More preferably, the comparing unit is connected to both of the first storage unit and the second storage unit and capable of outputting the detection signal at a time when the determining unit determines that a predetermined number of bits in the serial data are matched with the predetermined numbers of bits in the identification data.

The first storage unit is further capable of shifting the serial data received in accordance with a predetermined signal, preferably.

The serial data receiving device further includes a third storage unit connected to the first storage unit for receiving the shifted serial data from the first storage unit in synchronization with the predetermined signal and for storing the shifted serial data on a basis of a control signal, preferably.

The comparing unit is preferably connected to all of the first storage unit, the second storage unit, and the third storage unit, the comparing unit being capable of comparing the identification data with either the serial data stored in the first storage unit or the shifted serial data stored in the third storage unit and outputting the detection signal in accordance with a result of the comparison.

The comparing unit is preferably capable of outputting the detection signal at a time when the identification data stored in the second storage unit is matched with either the serial data stored in the first storage unit or the shifted serial data stored in the third storage unit.

The first storage unit is preferably composed of a first memory unit, the second storage unit is composed of a second memory unit, and the comparing unit is composed of a comparator.

The first storage unit preferably includes a plurality of first memory units connected in series for shifting the received serial data in order, the plurality of first memory units being capable of storing the serial data in order.

The second storage unit preferably includes a plurality of second memory units corresponding to the plurality of first memory units respectively for storing the identification data.

Preferably, the comparing unit includes a plurality of comparator units correspondingly connected to the plurality of first memory units and the plurality of second memory units respectively for comparing the serial data stored in the plurality of first memory units with the identification data stored in the plurality of second memory units.

More preferably, the determining unit is capable of determining one or more of the plurality of comparator units in which a comparison result indicates the serial data being matched with the identification data, and capable of outputting a determining signal therefrom at a time when at least one of the plurality of comparator units is determined.

Further preferably, the first storage unit is a data receiving shift register, the second storage unit is a data register, and the comparator unit is a data comparator, respectively.

The serial data receiving device further includes a unit connected to all of the first storage unit, the second storage unit and the comparing unit for controlling data processing in the serial data receiving device so that the serial data receiving device is capable of identifying data correctly even though the received data contains some degrees of error and/or different numbers of bits, preferably.

The controlling unit is a data processing circuit which includes a central processing unit, preferably.

The serial data receiving device further includes a unit connected to the first storage unit for generating the predetermined signal, preferably.

The generating unit is a shift clock, and the predetermined signal is a clock signal, preferably.

The data comparator includes a plurality of two-inputs exclusive NOR circuits, each of the plurality of two-inputs exclusive NOR circuits being capable of receiving bits of the serial data from the data receiving shift register as well as bits of the identification code from the data register, respectively, and each of the plurality of two-inputs exclusive NOR circuits being also capable of outputting 1 as an output signal at a time when two corresponding bits are matched, preferably.

Preferably, the determining unit is an identification control circuit.

More preferably, the detection signal is a data coincidence signal.

Further objects and advantages of the present invention will be apparent from the following description of the preferred embodiments of the invention as illustrated in the accompanying drawings.

BRIEF DESCRIPTION OF THE DRAWINGS

FIG. 5 shows an example of the serial data received by the serial data receiving device of FIG. 3;

FIG. 6 is a block diagram showing a structure of the second embodiment of the serial data receiving device according to the present invention;

FIG. 7 shows an example of data to be received by the serial data receiving device of FIG. 6;

FIG. 10 shows an example of data to be received by the serial data receiving device of FIG. 9.

DESCRIPTION OF THE PREFERRED EMBODIMENTS

Referring to the accompanying drawings, an embodiment of a serial data receiving device according to the present invention will be described in detail.

Figure 1:
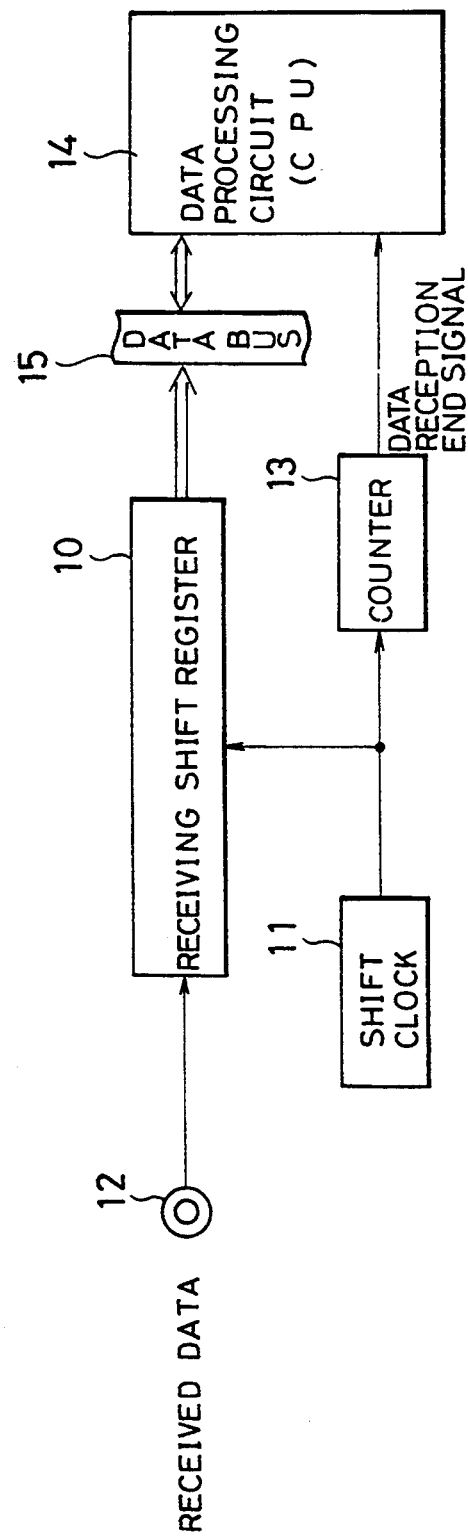
FIG. 1 is a block diagram showing an example of a structure of a known serial data receiving device.
Figure 2:
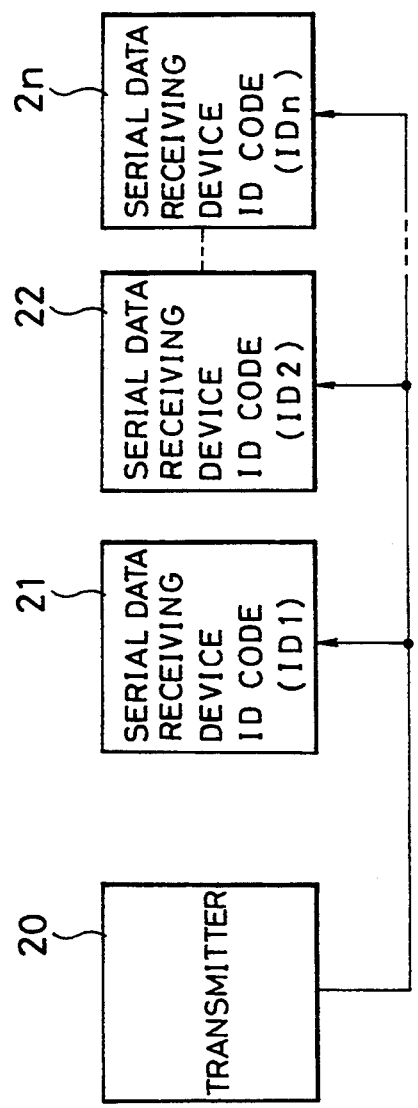
FIG. 2 is a block diagram showing a system formed by a plurality of serial data receiving devices of FIG. 1.
Figure 3:
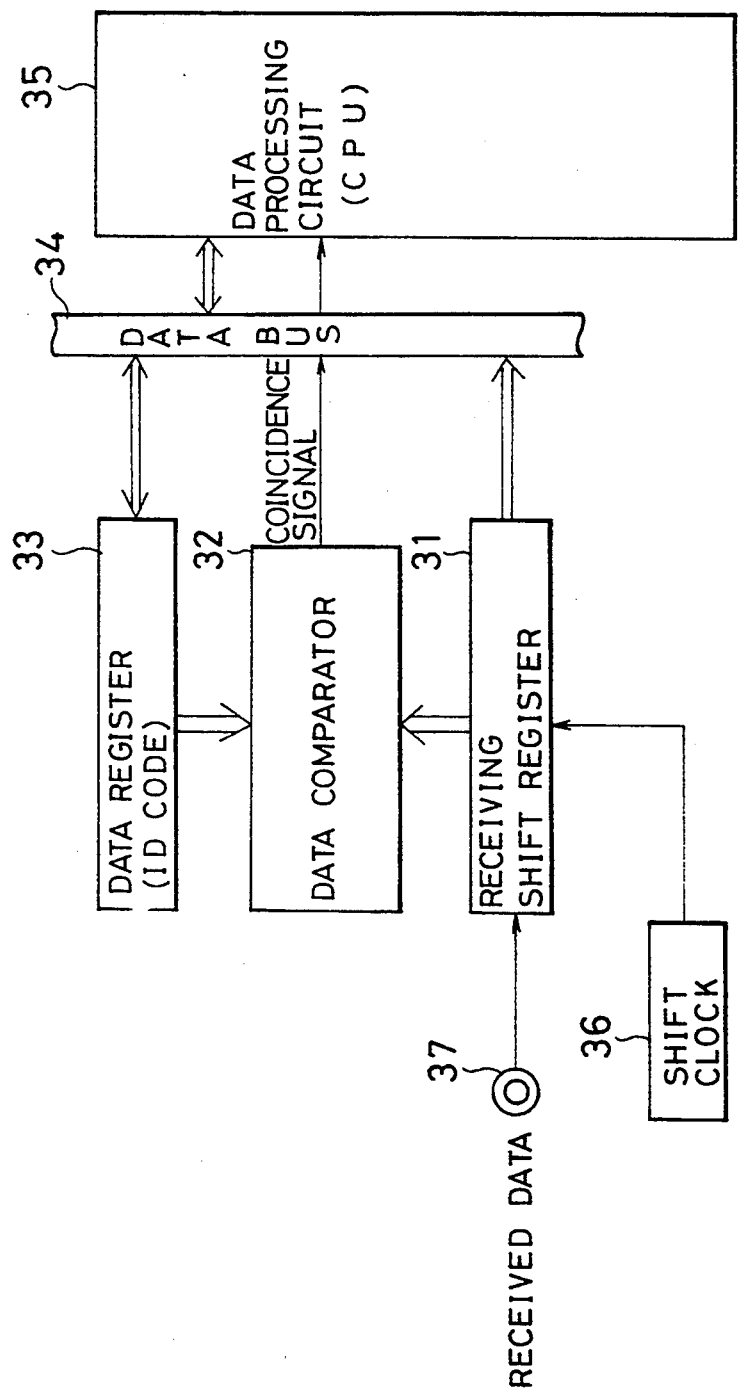
FIG. 3 is a block diagram showing a structure of the first embodiment of a serial data receiving device according to the present invention.

FIG. 3 is a block diagram showing a structure of a first embodiment of a serial data receiving device according to the present invention.

As shown in FIG. 3, the serial data receiving device includes a data receiving shift register 31, a data comparator 32, a data register 33, a data bus 34, a data processing circuit 35, a shift clock 36, and an input terminal 37.

In the following part, an operation of the serial data receiving device of FIG. 3 will be described by referring to each of the above-mentioned components.

The data receiving shift register 31, which is composed of an 8-bit shift register, receives the serial data input from the input terminal 37 in synchronization with the shift clock 36.

The data register 33, which is also composed of an 8-bit register, holds an ID code assigned to the serial data receiving devices.

The data receiving shift register 31 and the data register 33 are both connected through the data bus 34 to the data processing circuit (CPU) 35.

The data comparator 32 outputs a data coincidence-signal as a detection signal at a time when the second data held by the data register 33 matches data received by the shift register 31 or at a time when those data are matched except for one bit, that is, except for one bit the those data are matched completely.

Figure 4:
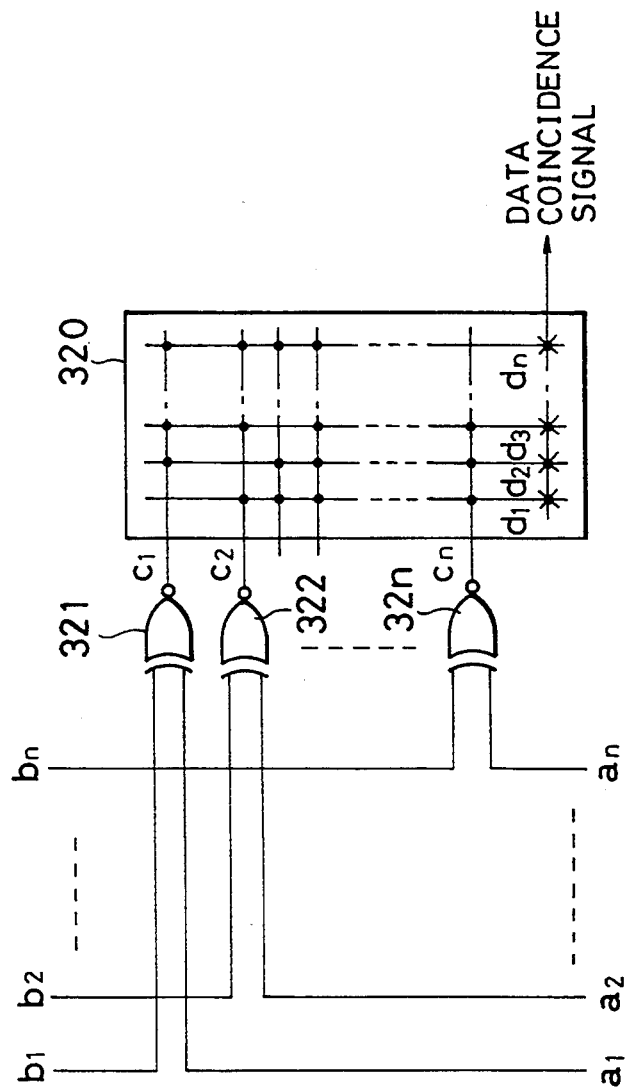
FIG. 4 is a circuit diagram showing a detailed structure of the data comparator in FIG. 3.

FIG. 4 shows a detailed structure of the data comparator 32 of FIG. 3.

Each of the two-inputs exclusive OR circuits 321 to 32n receives bits $a_1$ to $a_n$ of data from the shift register 31 as well as bits $b_1$ to $b_n$ of an ID code from the data register 33 of FIG. 3, respectively.

When two corresponding bits are matched, that is, $a_i = b_i$, the related exclusive NOR circuits send out "1" as output signals $c_i$.

A mark of ● in a programmable logic array (hereafter, referred to as PLA) 320 indicates that the logical AND is carried out on the values at points marked with ● in each vertical column, $d_1$ to $d_n$ denote the results of the AND operations.

Thus, $$d_1 = c_2 \bullet c_3 \bullet \ldots \bullet c_n$$
$$d_2 = c_1 \bullet c_3 \bullet \ldots \bullet c_n$$
$$\ldots$$
$$d_n = c_1 \bullet c_2 \bullet \ldots \bullet c_{n-1}$$

where, $d_1$ is "1" when $a_2=b_2, a_3=b_3, \ldots, a_n=b_n$, $d_2$ is "1" when $a_1=b_1, a_3=b_3, \ldots, a_n=b_n$, $d_3$ is "1" when $a_1=b_1, a_2=b_2, \ldots, a_{n-1}=b_{n-1}$.

The x indicates that the values marked with ● are ORed, and the OR of signals $d_1$ to $d_n$ is output as a data coincidence signal.

Therefore, in case that a logical value "1" is included in the signals $d_1$ to $d_n$, the logical value of the data coincidence signal is "1".

When the ID code assigned to a serial data receiving device is A5 in hexadecimal notation, the data processing circuit 35 sets this ID code data in the data register 33 through the data bus 34 of FIG. 3.

Under this condition, in a case that the serial data as shown in FIG. 5 is input from the input terminal 37 of FIG. 3, the data comparator 32 outputs a data coincidence signal at a time when a bit at point X is output from the data receiving shift register 31.

In FIG. 5, a bit at point Y is "1", therefore, the value of the underlined portion of the data is "B5" in hexadecimal notation. However, the inequality of one bit is tolerated, and the data comparator 32 outputs a data coincidence signal therefrom.

By receiving the data coincidence signal output from the data comparator 32, the data processing circuit 35 receives the data from the data receiving shift register 31 and then processes the-data received.

In this embodiment, the inequality of one bit is tolerated, but it is valid to tolerate the inequality of two or more bits. This function can be realized readily by making some alteration of the structure of the data comparator 32.

The number of bits of data held by the data receiving shift register 31 and the data register 33 is fixed, and the number of bits of data compared by the data comparator 32 is also fixed, so that the number of bits of received data for which coincidence can be detected is fixed. Therefore, when coincidence detection is to be performed for received data, the number of which is less that the number of bits of data compared by the data comparator 32, it is necessary to send dummy bits to compensate for a deficient portion of received data.

FIG. 6 shows a structure of a second embodiment of the serial data receiving device according to the present invention.

The serial data receiving device of FIG. 6 includes a receiving shift register 40, a receiving shift register 41, a buffer circuit 42, an AND circuit 43, a data comparator 44, and a data register 45, and an input terminal 46.

Each of the receiving shift registers 40, 41 is composed of an 8-bit shift register.

The receiving shift register 40 receives the serial data input from the input terminal 46 in synchronization with signals output from a shift clock (not shown) which are specified signals given through the buffer circuit 42. The receiving shift register 40 also shifts the received data in synchronization with signals from the shift clock.

The receiving shift register 41 receives the serial data supplied by the receiving shift register 40 in synchronization with signals output from the shift clock which are given through the AND circuit 43.

The AND circuit 43 controls whether or-not a signal from the shift clock is given to the receiving shift register 41, and gives a signal from the shift clock to the receiving shift register 41 only in case that a high-level control signal is input.

The data comparator 44 compares the serial data (parallel data) in parallel transmission by the receiving shift registers 40, 41 with the identification data held in the data register 45 which can holds 16-bit data, and the data comparator 44 also outputs a data coincidence signal at a time when those data are matched.

In the above-mentioned serial data receiving device, an ID code is stored in the data register 45 and a high-level control signal is given to the AND circuit 43 at a time when a determination of whether or not the received 16-bit serial data are matched with the identification data is made.

Under this condition, in a case that the serial data is input from the input terminal 46, the input serial data is then input into the receiving shift register 40 in synchronization with signals from the shift clock, and is input into the receiving shift register 41.

The data comparator 44 compares a low-order 8-bit parallel data output from the receiving shift register 40 and a high-order 8-bit parallel data output from the receiving shift register 41 with the 16-bit identification data-held in the data register 45, and the data comparator 44 also outputs a data coincidence signal at a time when those data are matched.

When a decision of whether or not a received 8-bit serial data are matched with the identification data is made, the identification data is stored in the low-order 8 bits of the data register 45, and "00" in hexadecimal notation is stored in the high-order 8 bits of the data register 45.

The receiving shift registers 40, 41 are initialized (that is, the held data is set to "0000"), and a low-level control signal is input into the AND circuit 43 to prevent signals, which are output from the shift clock, from being input into the receiving shift register 41.

Under this condition, in case that the serial data is input from the input terminal 46, the input serial data is input into the receiving shift register 40 in synchronization with signals output from the shift clock.

The data having been input into the receiving shift register 40 is output as 8-bit parallel data to the data comparator 44. However, since signals from the shift clock are not input into the receiving shift register 41, so that the receiving shift register 41 does not receive the serial data output from the receiving shift register 40, but outputs the data of "00" to the data comparator 44.

Therefore, the data comparator 44 outputs a data coincidence signal at time when the 8-bit data output from the receiving shift register 40 are matched with the low-order 8 bits of the identification data held in the data register 45.

For example, when the identification data held in the data register 45 is "00A5" in hexadecimal notation, and the serial data as shown in FIG. 7 is input from the input terminal 46, then the data comparator 44 outputs a data coincidence signal at a time when the receiving shift register 40 receives the data at point X.

In turn, a third embodiment of the serial data receiving device according to the present invention will be described in the following part.

Figure 8:
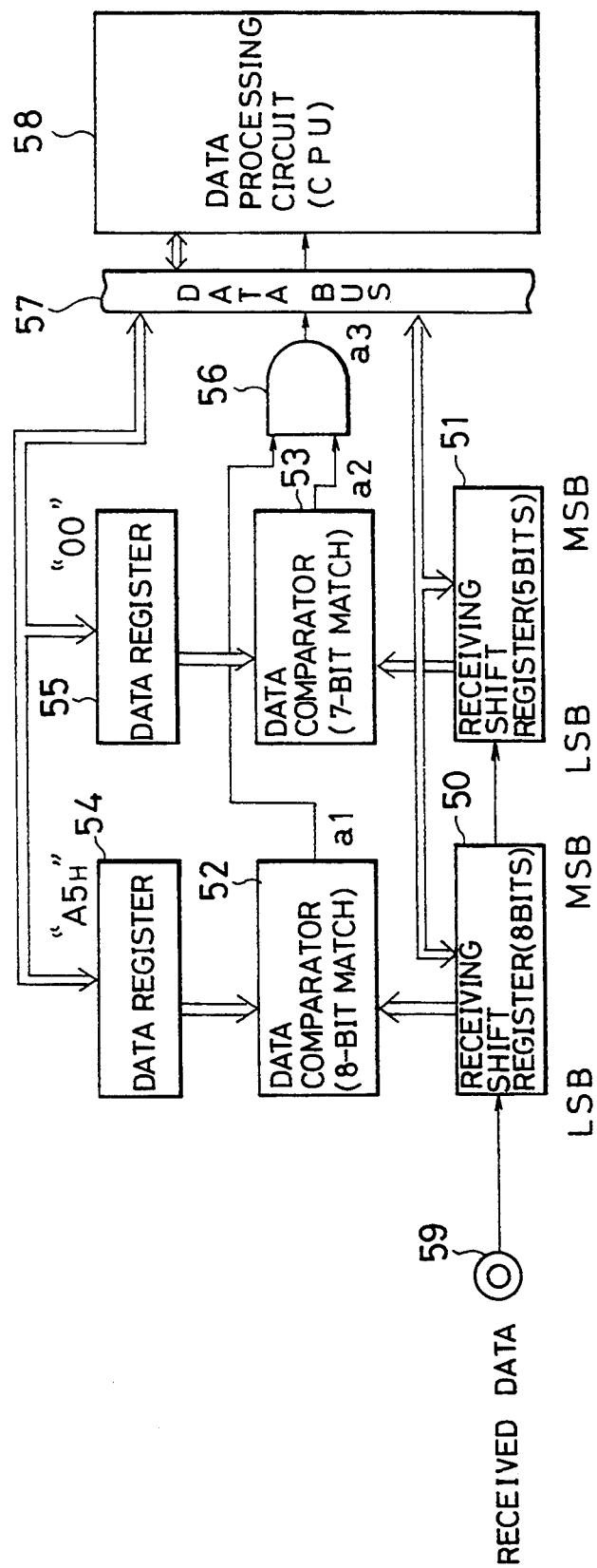
FIG. 8 is a block diagram showing a structure of the third embodiment of the serial data receiving device according to the present invention.

FIG. 8 is a block diagram showing a structure of the serial data receiving device according to this embodiment.

The serial data receiving device of FIG. 8 includes a plurality of shift registers 50, 51, a plurality of data comparators 52, 53, a plurality of data registers 54, 55, an AND circuit 58, a data bus 57, a data processing circuit 58, and an input terminal 59.

Each of the shift registers 50, 51 is composed of an 8-bit shift register.

The shift register 50 receives the serial data input from the input terminal 59 in synchronization with the specified signals output from a shift clock (not shown), and shifts the received data in synchronization with the signals output from the shift clock.

The shift register 51 also receives the serial data output from the shift register 50 in synchronization with the specified signals from the shift clock.

The data registers 54, 55 are 8-bit registers for holding the identification data in order to compare with the data held in the shift registers 50, 51.

The data comparator 52, which is an 8-bit comparator, compares the serial data held in the shift register 50 with identification data held in the data register 54.

The data comparator 53, which is also an 8-bit comparator, compares the serial data held in the shift register 51 with the identification data held in the data register 55.

The data comparator 52 outputs a high-level data coincidence signal a1 at a time when the two items of data are matched, while the data comparator 53 outputs a high-level data coincidence signal a2 at a time when the two items of data are matched perfectly or all bits are matched except for one bit, that is, the data comparator 53 outputs a high-level signal a2 at a time when seven or more bits of data are matched.

The AND circuit 56 receives the signals a1 and a2 from the data comparators 52 and 53, respectively, and outputs to the data processing circuit (CPU) 58 a data coincidence signal which serves as an identification signal at a time when the signals a1 and a2 are both at a high level.

The data processing circuit 58, connected through the data bus to the data registers 54, 55 and also to the shift registers 50, 51, sets the identification data in the data registers 54, 55, receives the serial data from the shift registers 50, 51 at a time when the data processing circuit 58 receives a high-level signal a3, and performs a predetermined process of the data.

A description will now be made of the operation of the above-mentioned serial data receiving device.

The data processing circuit 58 gives a signal through the data bus 57 to the data registers 54, 55 in order to store the identification data of "A5" and "00" in hexadecimal notation, for example.

In a case that, under this condition, the serial data is input from the input terminal 59, the shift register 50 receives the input serial data in synchronization with the signals output from the shift clock.

The shift register 51 receives the serial data output shifted from the shift register 50 in synchronization with the signals output from the shift clock.

The data comparators 52, 53 compare the serial data held in the shift registers 50, 51 with identification data held in the data registers 54, 55, respectively, and outputs a signal a1 or a2 according to a result of the comparison.

It is supposed that the serial data (see FIG. 10) is input from the input terminal 59. The sixteen-bit data at the underlined portion is input into the two shift registers 50, 51, then the data comparators 52, 53 output high-level signals a1, a2, respectively, indicating that the data are matched at a time when the data at the last point X is received by the shift register 50. At this time, the AND circuit 56 outputs to the data processing circuit 58 a high-level data coincidence signal a3 indicating that the serial data held in the shift registers 50, 51 are matched with the identification data of "00A5" held in the data registers 54, 55, respectively.

However, the value of the underlined data of the serial data (see FIG. 10) is actually "10A5" in hexadecimal notation, so that this data are not matched with the data in the data registers 54, 55 perfectly, but the data comparator 53 tolerates an error of one bit, and outputs a high-level signal a2 which is given at a time when seven or more bits are matched.

As a result, the AND circuit 56 outputs a high-level coincidence signal a3 to the data processing circuit 58.

Figure 9:
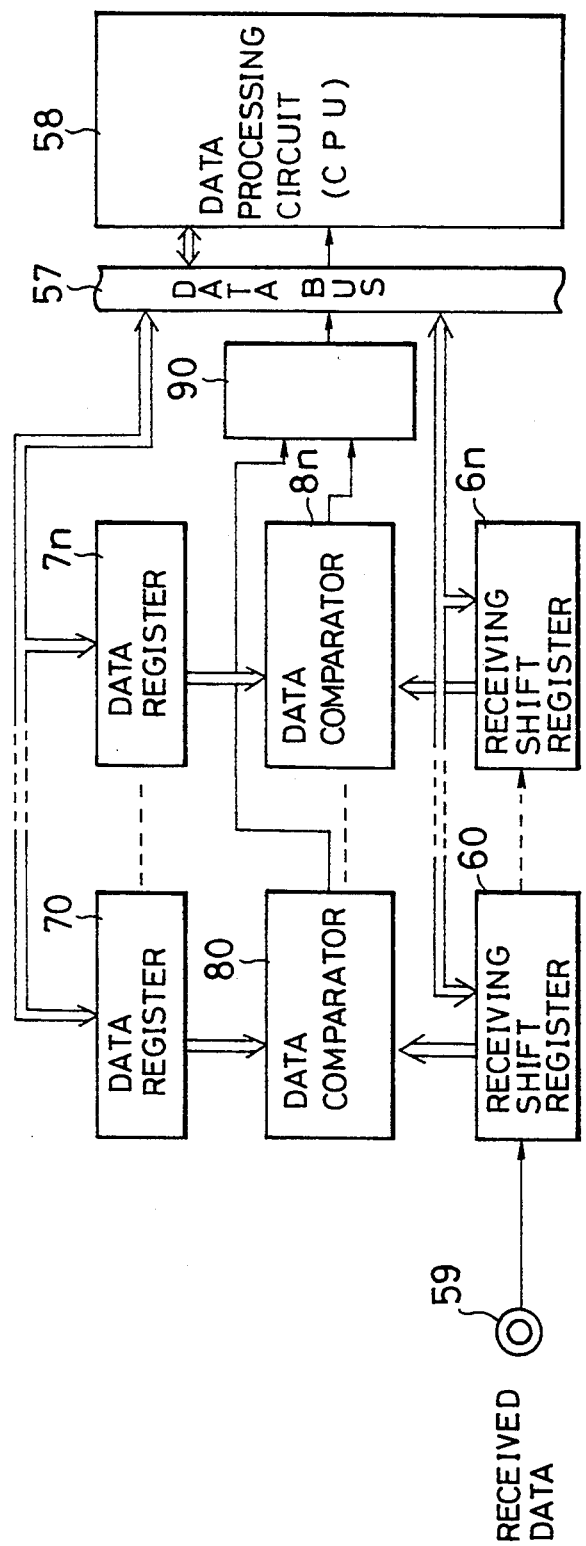
FIG. 9 is a block diagram showing a structure of the fourth embodiment of the serial data receiving device according to the present invention.

FIG. 9 shows a fourth embodiment of the serial data receiving device according to the present invention, which has an extended structure of the serial data receiving device of FIG. 8 with the same reference numbers for the same elements shown in FIG. 8.

The serial data receiving device of FIG. 9 includes the receiving shift registers 60 to 6n, the data registers 70 to 7n, the data comparators 80 to 8n for comparing the data held in the receiving shift registers 60 to 6n with the data held in the data registers 70 to 7n, and the data bus 57 and the data processing circuit 58.

The receiving shift registers 60 to 6n are connected in series such that the serial data output from the low-order registers are sequentially received by the high-order registers.

The data registers 70 to 7n are arranged to correspond to the receiving shift registers 60 to 6n, as mentioned above.

The data comparators 80 to 8n are arranged to compare the data held and output by the receiving shift registers 60 to 6n with the data output by the data registers 70 to 7n corresponding to the receiving shift registers 60 to 6n which output the data to be compared.

The identification control circuit 90 is arranged to output a signal representing the result of comparison between the data in the receiving shift registers 60 to 6n and the data in the data registers 70 to 7n on the basis of the comparison result by the data comparators 80 to 8n.

The control circuit 90 may be composed of a plurality of AND circuits 56 as shown in FIG. 8.

An operation of the above-mention extended serial data receiving device is described as a general form of the operation of the serial data receiving device of FIG. 8, therefore a detailed description of the operation of the above-mentioned extended serial data receiving device will be omitted.

Many widely different embodiments of the present invention may be constructed without departing from the spirit and scope of the present invention. It should be understood that the present invention is not limited to the specific embodiments described in the specification, except as defined in the appended claims.

What is claimed is:

1. A serial data receiving device which is capable of identifying serial data received even though the received data contains some degrees of error and/or different numbers of bits, said serial data receiving device comprising:

first storage means for receiving serial data, storing said received serial data and shifting said received serial data in accordance with a predetermined signal;

second storage means for storing an identification data;

third storage means connected to said first storage means for receiving said shifted serial data from said first storage means in synchronization with said predetermined signal and for storing said received serial data; and comparing means for comparing said serial data stored in said first storage means and said shifted serial data stored in said third storage means with said identification data stored in said second storage means and for outputting a detection signal in a case where a predetermined number of bits in said serial data is matched with a predetermined number of bits in said identification data; and wherein said comparing means compares said stored serial data in said first storage means with said identification data stored in said second storage means in a case where said received serial data in said first storage means has a number of bits which is identical with a number of bits in said first storage means without comparing said serial data stored in said third storage means with said identification data stored in said second storage means.

2. A serial data receiving device according to claim 1, further comprising an AND circuit connected to said third storage means for receiving a control signal and a shift clock, wherein said control signal is for controlling an output of said shift signal to said third storage means.

3. A serial data receiving device according to claim 1, wherein said comparing means comprises an identification control circuit.

4. A serial data receiving device according to claim 1, wherein said detection signal comprises a data coincidence signal.

5. A serial data receiving device according to claim 1, further comprising generating means connected to said first storage means for generating said predetermined signal.

6. A serial data receiving device according to claim 5, wherein said generating means comprises a shift clock and said predetermined signal comprises a clock signal.

7. A serial data receiving device which is capable of identifying serial data received even though the received data contains some degrees of error and/or different numbers of bits, said serial data receiving device comprising:

first storage means for receiving serial data, storing said received serial data and shifting said received serial data in accordance with a predetermined signal second storage means for receiving said serial data in synchronization with said predetermined signal from said first storage means, storing said received serial data and shifting said received serial data in accordance with said predetermined signal;

third storage means for storing first identification data;

fourth storage means for storing second identification data;

first comparing means for comparing said serial data stored in said first storage means with said first identification data stored in said third storage means and for outputting a first detection signal in a case where said serial data stored in said first storage means is matched with said first identification data; and second comparing means for comparing said serial data stored in said second storage means with said second identification data stored in said fourth storage means and for outputting a second detection signal in a case where a predetermined number of bits in said serial data is matched with a predetermined number of bits in said second identification data.

8. A serial data receiving device according to claim 7, further comprising an AND circuit connected to said first comparing means and said second comparing means for receiving said first detection signal and said second detection signal and for outputting a third detection signal.

9. A serial data receiving device according to claim 7, wherein said plurality of fourth memories corresponding to said plurality of second memories in order to store said second identification data in order.

10. A serial data receiving device according to claim 7, wherein said first storage means comprises a plurality of first memories, said second storage means comprises a plurality of second memories, said third storage means comprises a plurality of third memories, said fourth storage means comprises a plurality of fourth memories, said first comparing means comprises a plurality of first comparators, and said second comparing means comprises a plurality of second comparators.

11. A serial data receiving device according to claim 10, wherein said plurality of first memories is connected in series among each other in order to shift said received serial data in order, said plurality of first memories being capable of storing said shifted serial data in order.

12. A serial data receiving device according to claim 10, wherein said plurality of second memories is connected in series among each other in order to shift said serial data received from said first storage means in order, said plurality of second memories being capable of storing said shifted serial data in order.

13. A serial data receiving device according to claim 10, wherein said plurality of third memories corresponds to said plurality of first memories in order to store said first identification data in order.

14. A serial data receiving device according to claim 10, wherein said plurality of said first comparators is correspondingly connected to said plurality of first memories and said plurality of third memories respectively in order to compare said serial data stored in said plurality of first memories with said first identification data stored in said plurality of third memories.

15. A serial data receiving device according to claim 10, wherein said plurality of second comparators is correspondingly connected to said plurality of second memories and said plurality of fourth memories respectively in order to compare said serial data stored in said plurality of second memories with said second identification data stored in said plurality of fourth memories.

16. A serial data receiving device according to claim 10, wherein said first comparing means determines one or more of said plurality of first comparators in which a comparison result indicates said serial data being matched with said first identification data, and outputs said first detection signal therefrom in a case where at least one of said plurality of first comparators is determined.

17. A serial data receiving device according to claim 10, wherein said second comparing means determines one or more of said plurality of second comparators in which a comparison result indicates said serial data being matched with said second identification data, and outputs said second detection signal therefrom in a case where at least one of said plurality of second comparators is determined.

* * * * *